United States Patent
Fukaya et al.

(10) Patent No.: US 8,540,883 B2
(45) Date of Patent: Sep. 24, 2013

(54) POLYMER COMPOSITE, WATER-TREATMENT METHOD USING THE SAME AND MANUFACTURING METHOD OF THE SAME

(75) Inventors: Taro Fukaya, Kanagawa-ken (JP); Shinetsu Fujieda, Kanagawa-ken (JP); Shinji Murai, Kanagawa-ken (JP); Akiko Suzuki, Tokyo (JP); Hideyuki Tsuji, Kanagawa-ken (JP); Tatsuoki Kohno, Tokyo (JP); Nobuyuki Ashikaga, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/524,160

(22) Filed: Jun. 15, 2012

(65) Prior Publication Data

US 2012/0248041 A1    Oct. 4, 2012

Related U.S. Application Data

(62) Division of application No. 12/435,648, filed on May 5, 2009, now Pat. No. 8,221,622.

(30) Foreign Application Priority Data

May 8, 2008   (JP) ................... 2008-122105

(51) Int. Cl.
*C02F 1/48*   (2006.01)
*B32B 3/26*   (2006.01)
*B32B 5/02*   (2006.01)

(52) U.S. Cl.
USPC ........ 210/695; 210/222; 210/502.1; 210/504; 210/506; 428/361; 252/62.51 R

(58) Field of Classification Search
USPC ...... 210/222, 695, 502.1, 504, 506; 428/361; 252/62.51 R
See application file for complete search history.

(56) References Cited

U.S. PATENT DOCUMENTS

| | | | |
|---|---|---|---|
| 5,900,146 A | 5/1999 | Ballard et al. | |
| 8,221,622 B2 * | 7/2012 | Fukaya et al. | 210/222 |
| 2009/0314717 A1 | 12/2009 | Fujieda et al. | |
| 2009/0321363 A1 | 12/2009 | Murai et al. | |
| 2010/0059444 A1 | 3/2010 | Moniwa et al. | |
| 2010/0059448 A1 | 3/2010 | Fujieda et al. | |
| 2010/0072140 A1 | 3/2010 | Tsuji et al. | |

FOREIGN PATENT DOCUMENTS

JP   02-241541   9/1990

OTHER PUBLICATIONS

Japanese Office Action for Japanese Application No. 2008-122105 mailed on Oct. 5, 2012.

* cited by examiner

*Primary Examiner* — David A Reifsnyder
(74) *Attorney, Agent, or Firm* — Turocy & Watson, LLP

(57) ABSTRACT

A polymer composite is provided for a water treatment. The polymer composite with excellent workability is capable of adsorbing impurities in water, being rapidly separated from the water using magnetic forces. The polymer composite includes secondary aggregates. The secondary aggregates are formed of clumped particles, the particles being magnetic particles covered with a polymer. The polymer composite has porous structures suitable for adsorbing underwater impurities.

8 Claims, 2 Drawing Sheets

POLYMER COMPOSITE, WATER-TREATMENT METHOD USING THE SAME AND MANUFACTURING METHOD OF THE SAME

CROSS REFERENCE TO RELATED APPLICATIONS

This application is a Division of application Ser. No. 12/135,648 (now U.S. Pat. No. 8,221,622) filed May 5, 2009, the entire contents of which are incorporated herein by reference.

This application is based upon and claims the benefit of priority from the prior Japanese Patent Application No. 2008-122105, filed on May 8, 2008, the entire contents of which are incorporated herein by reference.

FIELD OF THE INVENTION

The present invention relates to a polymer composite including magnetic particles and a polymer.

DESCRIPTION OF THE BACKGROUND

Efficient use of water resources is demanded due to industrial developments or population growth in recent years. For that purpose, reuse of wastewater such as industrial wastewater is very important. In order to attain the reuse, it is required to separate foreign substances from wastewater, i.e., to purify water. As a method of separating foreign substances from a liquid, various kinds of methods are known. The methods include removal of suspended substances by means of membrane separation, centrifugal separation, activated carbon adsorption, ozonization, and condensation, etc., for example. Such a method allows it to remove chemical substances greatly influential to environments, e.g., phosphorus contained in water, nitrogen and oil/clay dispersed in water, etc. Although membrane separation is one of the most generally used methods among these, membranous fine pores of the membrane separation block up easily in removing underwater oils and there is a problem that a membranous usable life becomes short easily. Hence, membrane separation is not appropriate in many cases to remove underwater oils. As a technique for removing heavy oils from oil containing water, the following two methods are recited. For example, one is a method using buoyance of heavy oils. The method allows it to collect heavy oils floating on a water surface with an oil fence and then to vacuum up the oils. The other is a method in which hydrophobic adsorbent is laid on a water surface to collect heavy oils.

As an adsorbing method of underwater oils, there is known a method in which adsorbing polymer with hydrophilic and oleophilic blocks are used to adsorb oils and then the polymer having adsorbed the oils is removed from water. Such a polymer is disclosed by Japanese laid-open patent application JP-A 1995-102238 (Kokai). However, the method has a problem that not only separating an adsorbing polymer from water is troublesome, but also workability of the polymer is low due to softening of the polymer with oils adsorbed.

On the other hand, a method of magnetically separating adsorbent particles having adsorbed oils is also known. For example, Japanese laid-open patent application JP-A 2000-176306 (Kokai) discloses a method in which surfaces of magnetic particles are modified with stearic acid to make the particles adsorb underwater oils for collecting the oil. However, this method also has a problem that low molecular compounds such as stearic acid and a coupling agent adversely contaminate water due to the use of the acid and agent for the surface modifications of the magnetic particles.

SUMMARY OF THE INVENTION

An object of the invention is to provide a polymer composite and a water-treatment method using the same. The polymer composite is capable of adsorbing impurities in water to allow it to treat the water without contamination and with excellent workability, the impurities including an organic substance, an inorganic substance, ion etc.

To achieve the above object and according to one aspect of the invention, a polymer composite is provided. The polymer composite includes secondary aggregates. The secondary aggregates are formed of clumped particles, the particles being magnetic particles covered with a polymer.

To achieve the above object and according to other aspect of the invention, a water-treatment method is provided. The method includes dispersing the polymer composite into water containing impurities, making the polymer composite adsorb the impurities to surfaces of the polymer composite, and separating the polymer composite having adsorbed the impurities by using magnetic forces.

To achieve the above object and according to other aspect of the invention, a manufacturing method of the polymer composite is provided. The method includes preparing a composition of magnetic particles, a polymer and a solvent capable of dissolving the polymer, and spray-drying the composition.

BRIEF DESCRIPTION OF DRAWINGS

The accompanying drawings, which are incorporated in and constitute a part of this specification, illustrate embodiments of the invention and together with the description, serve to explain the principles of the invention.

DETAILED DESCRIPTION OF THE INVENTION

Polymer Composite

Figure 1:
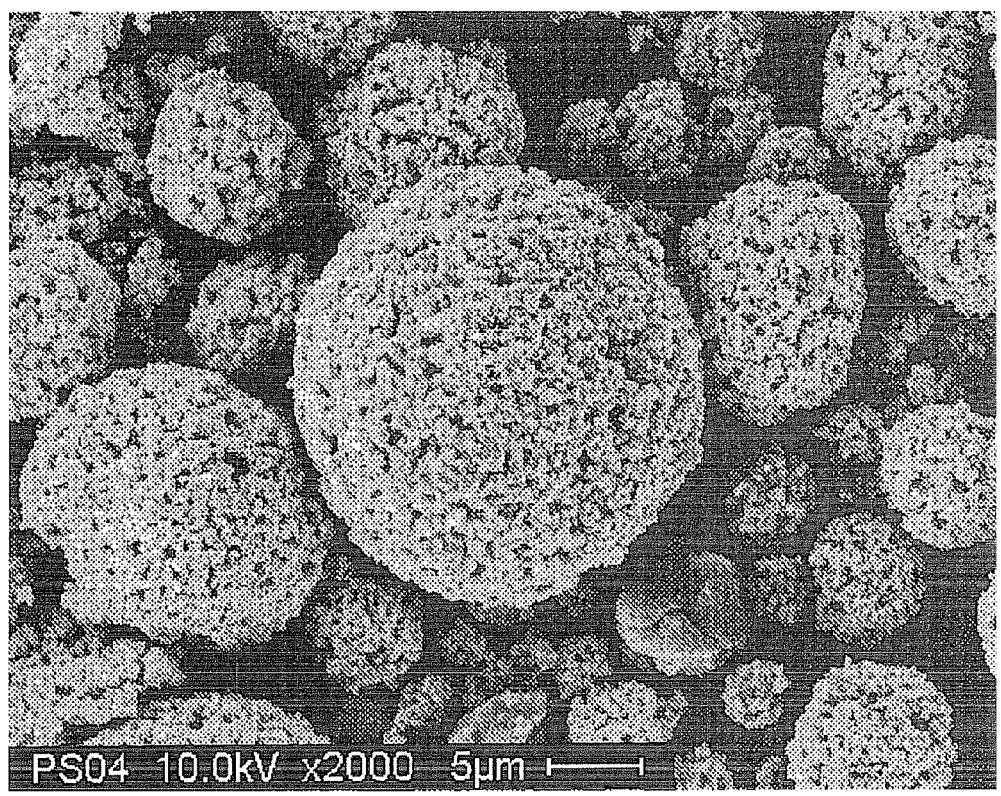
FIG. 1 shows an SEM micrograph of the whole shape of the secondary aggregates in the polymer composite according to the invention.

A polymer composite according to the invention includes secondary aggregates. The secondary aggregates are formed of clumped particles, the particles being magnetic particles covered with a polymer. That is, the particles have core/shell structures in which the cores and shells correspond to magnetic particles and polymer layers covering the magnetic particles, respectively. The "magnetic particles" mean magnetic particles being not covered with a polymer. The particles clump together to form the secondary aggregates.

The magnetic particles forming the cores of the particles are not limited particularly only if they are ferromagnetic. As for a magnetic material used for reducing to the magnetic particles, it is preferable to adopt a substance that shows ferromagnetism around at room temperature. However, a practice of the present invention should not be limited to the above-described. In the practice, ferromagnetic substances may be generally used. The substances include, for example, iron, alloys containing iron, magnetite, titanic iron ore, magnetic pyrite, magnesia ferrite, cobalt ferrite, nickel ferrite, barium ferrite, etc. A ferrite series compound is chemically stable in water, being effective for the practice of the invention. For example, magnetite ($Fe_3O_4$) is magnetically stable even underwater and atoxic as a material. Magnetite is not only cheap but also easy to use preferably for water treatment. Although the magnetic particles can be various, e.g., spherical, polyhedral or irregular in shape, the magnetic particle shape is not limited to a specific one of these. What is necessary for using is just to select a preferable diameter and shape of the magnetic particles suitably from the view point of manufacturing cost, etc. As for the shape, spherical magnetic particles or polyhedral ones with their corners rounded are preferable. Magnetic particles with acute corners could damage polymer layers covering the particles to make it difficult to keep their shapes. If needed, the magnetic particles may undergo metallizing plating such as Cu-plating and Ni-plating, etc.

In addition, all the magnetic particles do not need to consist of ferromagnetic substances in the present invention. That is, the magnetic particles may be very fine to be combined with resin binders. Corrosion control may be given to surfaces of the magnetic particles as a surface treatment for the magnetic particles. As will be described, it is necessary that finally obtained polymer composites include just magnetic integrant in their bodies so that the particles and secondary aggregates are attracted by magnetic forces to be collected.

A mean diameter of the magnetic particles may be selected appropriately according to various conditions such as density of the magnetic particles, kinds and density of a used polymer, density of polymer composites, etc. The mean diameter is selected to be normally 0.05 to 100 μm, and preferably 0.2 to 5 μm in the present invention. Here, the mean diameter is measured with laser diffractometry. Specifically, the mean diameter can be measured with a SALD-DS21 Laser Diffraction Particle Size Analyzer (trade name) manufactured by SHIMADZU Corporation, etc. When the mean diameter is larger than 100 μm, the secondary aggregates tend to become too large, having low dispersibility in water. The aggregates also tend to reduce an adsorbed amount of oils due to a decrease in an effective surface area of the aggregates. When the magnetic particles diameters are smaller than 0.05 μm, the particles tend to clump together densely and to undesirably reduce the surface area of the polymer composite.

The magnetic particles taken into the polymer composite function as cores, maintaining shapes of the composite. If the polymer composite does not include cores of the magnetic particles, the polymer layers become soft and are difficult to maintain the shapes of the composite when collecting oils dispersing underwater in particular. In some cases, the secondary aggregates could further clump together with each other and become difficult to collect. The polymer composite according to the invention includes the magnetic particles as cores. This allows the polymer composite to maintain their shapes as adsorption particles, making it easy to finally collect them. The magnetic particles are taken into the polymer composite to increase the specific gravity of the composite. This allows it to use gravitational sedimentation or centrifugal separation using a cyclone separator in combination with the magnetic separation, further allowing it to separate the polymer composite having adsorbed impurities from water rapidly.

In the scope of the invention, a polymer which covers surfaces of the magnetic particles may be selected arbitrarily in accordance with a purpose of its use. That is, when using the polymer composite for water treatment, what efficiently adsorbs impurities is used preferably. The impurities to be removed from water include an organic substance, an inorganic substance, and ion, etc.

It is preferable to use a polymer with low solubility in water, the polymer covering surfaces of the magnetic particles. It is specifically preferable that the solubility in water is 10 mg/L or less, and more preferable that the solubility is 10 μg/L or less. This is for preventing the polymer from its elution into water when the polymer composite is used for water treatment.

On the other hand, it is preferable to employ a polymer with low solubility in specific organic solvents. That is, the polymer composite collected after having adsorbed impurities can be recycled in some cases. In the recycle, adsorption efficiency of the polymer composite is needed to be restored by washing the polymer composite with a suitable solvent to remove the impurities adsorbed to the surface of the polymer composite. Therefore, the specific solvents to dissolve impurities and not to dissolve the polymer are used at the time of washing. Such a solvent is arbitrarily selected in accordance with kinds of impurities and polymers. However, a cheap and safe solvent is generally needed as a solvent for washing the polymer composite. Specifically, the specific solvents for washing the polymer composite include methanol, ethanol, n-propanol, isopropanol, acetone, tetrahydrofuran, n-hexane, cyclohexane, and these mixtures. It is preferable that the polymer to cover surfaces of the magnetic particles is insoluble in the specific organic solvents listed above.

On the other hand, when manufacturing the polymer composite according to the invention, a polymer is provided as a liquid solution obtained by dissolving the polymer to an organic solvent, and the liquid solution is coated to surfaces of the magnetic particles. It is, therefore, preferable that the polymer has more than a certain level of solubility in organic solvents different from the specific organic solvents listed above. The organic solvents to dissolve such a polymer include isobutanol, isopropyl ether, diethylether, xylene, chloroform, ethyl acetate, butyl acetate, propyl acetate, acetic acid methyl, dioxane, cyclohexanol, cyclohexanone, dibutyl ether, dimethylaniline, tetrahydrofuran, toluene, butanol, chlorofluocarbon, hexyl alcohol, methyl isobutyl ketone, methyl ethyl ketone, etc. As described above, the solvents being normally difficult to dissolve the polymer include ethanol, n-propanol, isopropanol, acetone, tetrahydrofuran, n-hexane and cyclohexane, etc. However, the solvents could dissolve the polymer in some cases, depending on kinds of polymers, and then can be used as a solvent to dissolve the polymer.

The polymers meeting the above conditions include polystyrene, hydrogenation polystyrene, polybutadiene, polyisoprene, polyacrylonitrile or polycycloolefin, polyvinylpyridine, and polyvinylbutyral to be preferably used for the polymer composite according to the invention. More specifically, polystyrene, polyvinylipyridine, polycycloolefin (brand name: ZEONEX 480 manufactured by ZEON Co., Ltd.), polyvinylbutyral, polystyrene-polybutadiene copolymer, polybutadiene, polyacrylonitrile-polybutadiene copolymer, polystyrene-polyisoprene copolymer, hydrogenation polystyrene-polybutadiene copolymer, etc. are included.

The polymer composite according to the invention includes mainly the secondary aggregates resulted from the particles having clumped together. The magnetic particles covered with the polymer are referred to as the particles as already described above. It is preferable that the secondary aggregates are characteristic in shape. $0.001 \leq F/(C \times D \times E) \leq X$ is preferably satisfied, and $0.005 \leq F/(C \times D \times E) \leq X/10$ is more preferably satisfied by C, D, E, F and X. Here, C, D, E, F and X represent a specific surface area [$m^2/g$] of the magnetic particles, a content rate [%] of the magnetic particles to a whole weight of the polymer composite, density of the polymer [$g/cm^3$], a content rate [%] of the polymer to a whole weight of the polymer composite and a mean diameter [$\mu m$] of the magnetic particles, respectively. $F/(C \times D \times E)$ is a parameter equivalent to a thickness of the polymer layer covering the magnetic particles.

A total coating volume of the polymer layer can be measured by observations using an optical microscope, SEM, etc. It is more preferable to obtain the volume from a weight reduction in the polymer composite due to its thermodecomposition, the thermodecomposition being carried out with elevating temperature in an absence of oxygen. The amount of the weight reduction results in the total coating volume of the polymer. The coating volume thus obtained allows it to evaluate precisely a mean thickness of the polymer layer using the specific surface area of the magnetic particles.

When the value of $F/(C \times D \times E)$ exceeds $X/10$, the surface area of the polymer composite tends to be smaller, the oil adsorbing capability tending to be lower with the thicker polymer layer. When the value of $F/(C \times D \times E)$ becomes smaller than $X/10$, the secondary aggregates tend to be brittler and their shapes tend to be easier to collapse with the thinner polymer layer.

Furthermore, it is preferable that the polymer composite has a porous structure. The polymer composite according to the invention includes secondary aggregates. The secondary aggregates are formed of the particles having clumped together, thus making the surface of the polymer composite nonsmooth and comparatively large. For this reason, the polymer composite with a porous structure is advantageous to adsorb underwater impurities. The porous structure provides the polymer composite with higher adsorption efficiency. For this reason, when the above-mentioned parameter $F/(C \times D \times E)$ is low, the polymer composite easily takes a porous structure, being more preferable. The parameter $F/(C \times D \times E)$ does not directly indicate existence or nonexistence of porous structures of the polymer composite, while most of the polymer composites tend to have porous structures in the range of $0.005 \leq F/(C \times D \times E) \leq X/10$, the structures also depending on kinds of used polymers.

Figure 2:
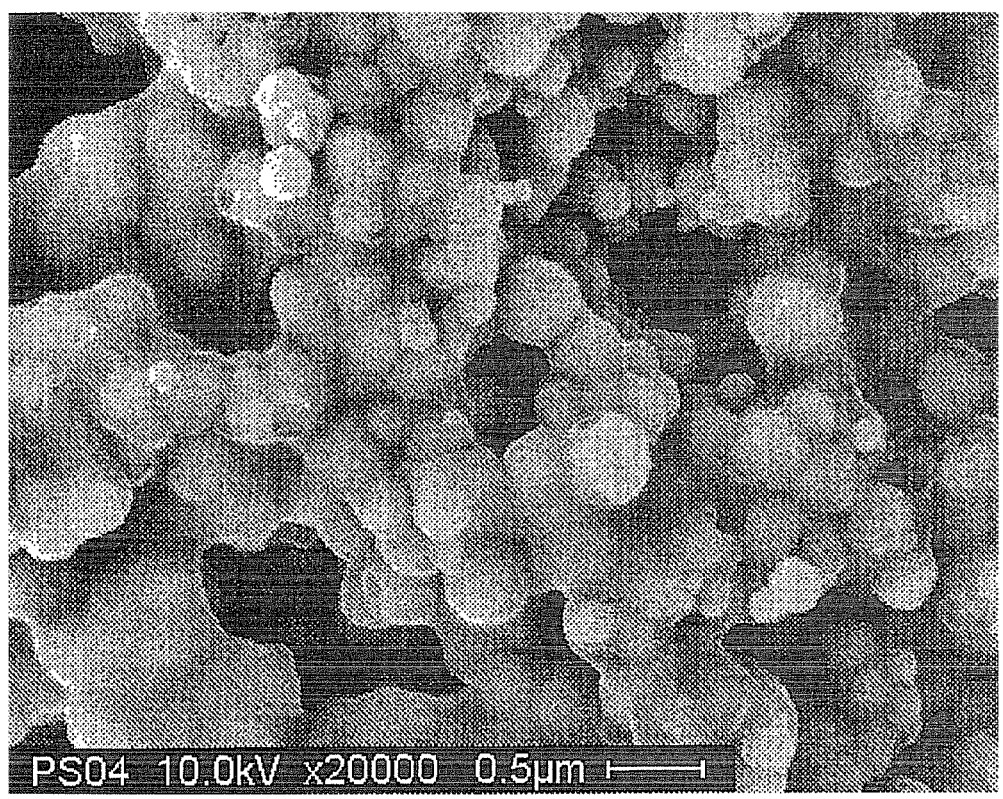
FIG. 2 shows an SEM micrograph taken for the surface of the secondary aggregates according to the invention.

SEM micrographs of the polymer composite with a porous structure according to the invention are shown in FIGS. 1 and 2. FIG. 1 shows an SEM micrograph of the whole secondary aggregates in the polymer composite. FIG. 2 shows an SEM micrograph taken for the surface of the secondary aggregates with a higher magnification. The SEM micrographs clarify that the particles clump together with each other to form the secondary aggregates having a porous structure.

In addition, the particle diameters of the polymer composite according to the invention, i.e., the diameters of the secondary aggregates, are not limited particularly. However, a ratio Z/X of the mean diameter Z of the second aggregates to the mean diameter X of the magnetic particles is preferably in the range of 10-10000, and is more preferably in the range of 20-500, from the view point of easy handling and dispersibility in water. When the ratio Z/X is smaller than the above-described range (smaller aggregates), handling the polymer composite tends to become more difficult. When the ratio Z/X is larger than 10000 (larger aggregates), the polymer composite tends to be more difficult to disperse in water. Here, the mean particle diameter of the secondary aggregates is measured using an SEM microscope. The mean diameter can be automatically calculated with a commercial image-analysis software, while the mean diameter of the secondary aggregates can be measured by deriving the mean diameter of the second aggregates on an arbitrary straight line drawn (for example, on a diagonal line) on an SEM micrograph, for example.

Although the density of the polymer composite according to the invention is not limited in particular, it is generally more than 2 $g/cm^3$, and is preferably 3 $g/cm^3$ or more and 10 $g/cm^3$ or less. The polymer composite according to the invention may not have a smooth surface, preferably having porosity. When the composite is dispersed in water, air bubbles can adhere to the surface, or the air can go into the inside of the composite. For this reason, when the density of the polymer composite itself is too low, the polymer composite floats on the water as a result. Then it is necessary to churn the water to make the polymer composite disperse in the water, taking energy in some cases. On the contrary, when the density of the polymer composite itself is too high, the polymer composite goes to the bottom of the water. Then it is necessary to churn the water to make the polymer composite disperse in the water, taking energy in some cases.

A Manufacturing Method of the Polymer Composite

The polymer composite according to the invention can be manufactured by any methods, as long as the above-described structures of the polymer composite according to the invention are developed by the methods. A spray-drying technique is exemplified as one of the methods. In the method, the polymer is dissolved in an organic solvent to obtain a composition of a solution with the magnetic particles dispersed, the composition being spray-dried to eliminate the organic solvent. According to the method, a mean diameter of the secondary aggregates can be controlled by adjusting ambient temperature and a spray velocity for the spray-drying. Furthermore, the organic solvent is eliminated through clearances among the particles to form pores, resulting in an appropriate porous structure.

A polymer solution is made of a polymer-soluble organic solvent and a polymer dissolved in the solvent industrially. The polymer solution is poured to the surface of, e.g., molded magnetic powder to be hardened by eliminating the organic solvent, the hardened then being crushed. Or it is also possible to prepare the polymer solution with magnetic particles dispersed, and then to eliminate the organic solvent for hardening, the hardened being finally crushed. The polymer composite according to the invention is obtained through the above-described process. The polymer composite according to the invention is obtained through the above-described process. Also in this case, when eliminating the organic solvent from the composition etc., pores are formed in the hardened thing, and the pores remain also in the polymer composite, giving rise to a porous structure. Moreover, the polymer composite can be manufactured by dropping a composition of the magnetic particles and a solvent dissolving the polymer into a Henschel mixer, a ball mill or a granulator, and then by drying the composition. Then a manufacturing condition for covering the surfaces of the magnetic particles and a condition of making the particles clump together are required to be met for manufacturing the preferable polymer composite. That is, the two steps are required for the manufacturing.

A Water-Treatment Method

A water-treatment method according to the invention is a method concerning separation of impurities from impurities-containing water. Here, the impurities mean that they are contained in a water supposed to be treated and should be removed in using the water. Therefore, the impurities in the present invention may be organic, inorganic or ionic in form. However, it is preferable to use the polymer composite according to the invention for treating water. The water is supposed to contain organic substances, in particular oils as impurities from the viewpoint of sorbability, shape preservation after adsorption, collecting methods after adsorption, etc. of the polymer composite. Generally oils are liquids at room temperature, poorly soluble to water, and have comparatively high viscosity and lower specific gravity than water. More specifically, they are animal-and-vegetal oils and fats, hydrocarbons, aromatic oils, etc. They are represented by fat acid glyceride, petroleum, higher alcohol, etc. Since these oil-like substances are characterized by their respective functional groups, etc., it is preferable to select the polymer to constitute the polymer composite according to each functional group.

In the water-treatment method according to the invention, the polymer composite is dispersed into the water containing the above-described impurities. The surface of the polymer composite is covered with the polymer, and the polymer adsorbs the impurities due to the affinity between the polymer and the impurities. Since the polymer composite according to the invention preferably has a nonsmooth surface, preferably a porous structure, the polymer composite has a large surface area, and its adsorption efficiency is high. The adsorption rate of the polymer composite according to the invention is very high although it depends also on the impurity density or an additive amount of the polymer composite. When a sufficient amount of the polymer composite is put in the water, generally more than 80%, preferably more than 97%, more preferably more than 98% and most preferably 99% of the impurities are adsorbed onto the surface of the polymer composite.

After the polymer composite has adsorbed the impurities onto its surface, the composite is separated from the water, the impurities being removed from the water as a result. Here, magnetic forces are used to separate the polymer composite from the water. That is, the magnetic particles used for the cores of the polymer composite are attracted by a magnet, resulting in an easy collection of the composite. Here it is possible to use sedimentation by gravitational force and a centrifugal separation by a cyclone separator combined with the separation by the magnetic force. The combined use of the above methods improves the workability and allows it to collect the polymer composite more rapidly.

Water targeted by the water treatment is not limited particularly. Specifically, the water treatment can be applied to industrial wastewaters, sewage waters, human sewage, etc. An impurity concentration of the targeted water is not limited particularly. When the impurity concentration is extremely high, a large amount of the polymer composite is needed. Therefore, it is more efficient to firstly attenuate the water by another method followed by treating the attenuated water. Specifically, the water-treatment method according to the invention is preferably used for water with an impurity concentration of 1% or less and more preferably to use for water with an impurity concentration of 0.1% or less.

The polymer composite collected after the water treatment can also be recycled. In order to recycle, it is required to remove the adsorbed impurities from the polymer surface. In order to remove such impurities, it is preferable to wash the polymer composite by solvents. The solvents used for this case, which do not dissolve polymer but dissolve impurities, include methanol, ethanol, n-propanol, isopropanol, acetone, tetrahydrofuran, n-hexane, cyclohexane, and mixtures of these. Moreover, solvents other than the above-listed can be used according to kinds of polymers and impurities.

The invention is described more in detail with reference to examples.

EXAMPLE 1

3 parts by weight of polystyrene (density 1.05 g/cm$^3$) are dissolved in 300 mL of tetrahydrofuran to obtain a solution. The magnetite particles with a mean diameter of 800 nm are further dispersed into the solution to produce a composition. This composition was sprayed using a mini spray dryer (B-290, manufactured by SIBATA SCIENTIFIC TECHNOLOGY Ltd) to produce the polymer composite formed of secondary aggregates. The secondary aggregates are formed of clumped particles, the particles being the magnetic particles covered with the polymer. The secondary aggregates are spherical in shape with a mean diameter of 10 μm (Z/X=12.5) as shown in FIG. 1. The actual amount of the covering polymer was evaluated using thermogravimetric-analysis equipment, the evaluation resulting in 14.1% of the total mass. Then the value of F/(C×D×E) was 0.027.

0.1 g of the polymer composite obtained as an example 1 was put into a 50-mL color comparison tube. Then 20 mL of water containing 100 μL of a straight chain fatty series oil was put in the tube and mixed well to make the polymer composite adsorb the oil. Then, after taking the polymer composite out of the color comparison tube using a magnet, 10 mL of hexane was added to the composite. Then, the hexane and composite were mixed well to extract the oil in the water. This hexane was analyzed using a gas chromatograph mass spectrometer to measure the oil adsorption amount. The analysis showed that 98.7 μL of the oil were adsorbed. The polymer composite having adsorbed the oil was put into 10 mL of hexane. Then the composite and hexane were mixed well. The polymer composite was taken out of the hexane using a magnet to be analyzed. The analysis showed that the entire amount of the oil was removed from the composite. That is, the oil was removed almost completely.

EXAMPLES 2 to 7

The same composition as that of the example 1 was sprayed with changing a spray condition of the mini spray dryer to produce polymer composites, as examples 2 to 7, formed of secondary aggregates with different diameters, as shown in TABLE 1. Then the oil adsorption amount was evaluated for each sample. The result is shown in TABLE 1.

TABLE 1

| | Magnetite | | Polymer Composite | | | | |
|---|---|---|---|---|---|---|---|
| | Mean Particle Diameter [μm] | specific surface area [m²/g] | Mean Diameter of Aggregates [μm] | Z/X | F/CDE | Performance of oil adsorption [μL] | remarks |
| Example 1 | 0.8 | 5.7 | 10 | 12.5 | 0.027 | 98.7 | |
| Example 2 | 0.8 | 5.7 | 2 | 2.5 | 0.026 | 97.1 | slow collection |
| Example 3 | 0.8 | 5.7 | 8 | 10.0 | 0.027 | 99.2 | |
| Example 4 | 0.8 | 5.7 | 50 | 62.5 | 0.027 | 99 | |
| Example 5 | 0.8 | 5.7 | 200 | 250.0 | 0.025 | 99.1 | |
| Example 6 | 0.8 | 5.7 | 400 | 500.0 | 0.026 | 98.8 | |
| Example 7 | 0.8 | 5.7 | 1000 | 1250.0 | 0.025 | 99.1 | slow oil adsorption |

However, the mean diameter of the aggregates of the example 2 was smaller than that of the example 1, taking twice as much time as in the example 1 to separate the polymer composite from the water in the example 2. Moreover, since the secondary aggregates of the example 7 had a larger diameter, the dispersibility in the water became worse. As a result, it took triple as much time as in the example 1 to adsorb the oil in the water of the example 7. However, the oil adsorption was well-done, independently of the mean diameter of the secondary aggregates. It was not observed that the aggregates adhered to the wall of the color comparison tube.

EXAMPLES 8 to 14

Polymer composites were produced as examples 8 to 15 as well as in the example 1 except having changed an additive amount of polystyrene as shown in TABLE 2. It was possible that the polymer composites of the examples 8 to 14 adsorbed the oil in the water and were magnetically separated easily as well as in the example 1. The example 13 with a reduced polymer amount showed a phenomenon in which the water muddied, being black in color during mixing in the color comparison tube. It was observed using an SEM that porous secondary aggregates had collapsed. It is, however, confirmed that not less than 80% of the oil was adsorbed, and the sufficient adsorption capability was confirmed. Moreover, porous structures were not observed for the example 14 using the SEM. After adsorbing the oil, the secondary aggregates further clumped together, giving rise to large lumps after collection. The lumps adhered to the wall of the color comparison tube, and were difficult to separate. However, even in this case, a high adsorption rate of 97.5% was attained EXAMPLES 15 to 18

Polymer composites were produced as examples 15 to 18 as well as in the example 1 except having used magnetite particles with various particle diameters as shown TABLE 3. The polymer composites produced using magnetite adsorbed the oil in the water similarly to the polymer composite of the example 1, the magnetite having a mean diameter of 50 nm-4.9 μm. The magnetic separations of the composites were successfully carried out.

COMPARATIVE EXAMPLE 1

Coreless polymer particles were produced as a comparative example 1 in the same way as that in the example 1 except magnetite particles not being included, as shown in TABLE 3. The polymer particles obtained had a mean diameter of about 4 μm and no porous structures. An oil adsorption experiment was carried out as well as in the example 1. The experiment showed an oil adsorption actually. After adsorbing the oil, the polymer particles further clumped together to form large adhesive lumps after collection. The lumps adhered to the wall surface of the color comparison tube, and were not separated magnetically, as a matter of course. The lumps were difficult to separate from the water.

COMPARATIVE EXAMPLE 2

Magnetic particles without polymer layers were prepared as a comparative example 2 in the same way as that in the example 1 except polystyrene not being included as shown TABLE 3. The particles obtained by spraying had a mean diameter of 800 nm, being almost the same as those before being sprayed. Oil adsorption was tested for the particles as

TABLE 2

| | Magnetite | | Polymer Composite | | | | |
|---|---|---|---|---|---|---|---|
| | Mean Particle Diameter [μm] | specific surface area [m²/g] | Mean Diameter of Aggregates [μm] | Z/X | F/CDE | Performance of oil adsorption [μL] | remarks |
| Example 8 | 0.8 | 5.7 | 2.4 | 3.0 | 0.001 | 99 | |
| Example 9 | 0.8 | 5.7 | 4 | 5.0 | 0.006 | 99.2 | |
| Example 10 | 0.8 | 5.7 | 8 | 10.0 | 0.017 | 99 | |
| Example 11 | 0.8 | 5.7 | 10 | 12.5 | 0.068 | 98.7 | |
| Example 12 | 0.8 | 5.7 | 8 | 10.0 | 0.079 | 98.1 | |
| Example 13 | 0.8 | 5.7 | 2 | 2.5 | 0.0006 | 84.5 | Collapse of secondary aggregates |
| Example 14 | 0.8 | 5.7 | 4 | 5.0 | 0.117 | 97.5 | big lumps after adsorption | well as in the example 1. The particles did not adsorb the oil, probably because they had no polymer layers.

TABLE 3

|  | Magnetite | | Polymer Composite | | | | |
| --- | --- | --- | --- | --- | --- | --- | --- |
|  | Mean Particle Diameter [μm] | specific surface area [m²/g] | Mean Diameter of Aggregates [μm] | Z/X | F/CDE | Performance of oil adsorption [μL] | remarks |
| Example 15 | 0.05 | 35 | 1.2 | 24.0 | 0.003 | 96.4 | |
| Example 16 | 0.3 | 15 | 4 | 13.3 | 0.009 | 98.1 | |
| Example 17 | 3.4 | 3.4 | 25 | 7.4 | 0.081 | 99.6 | |
| Example 18 | 4.9 | 2.5 | 80 | 16.3 | 0.21 | 99.2 | |
| Comparative Example 1 | None | — | 4 (spherical) | — | — | 98.9 | difficult to separate, because of adherence to wall of color comparison tube |
| Comparative Example 2 | 0.8 | 5.7 | — | — | — | 11.2 | mostly no oil adsorption |

EXAMPLES 19 to 27

Polymer composites were produced as examples 19 to 27 in the same way as that in the example 1, except the covering polymer being altered from polystyrene to various polymers, as shown in TABLE 4. All the composites with the various polymers showed good oil absorption. They did not adhere to the wall surface of the color comparison tube, being well separated magnetically.

TABLE 4

|  | Covering Polymer | Mean Diameter of Aggregates [μm] | Z/X | F/CDE | Performance of oil adsorption [μL] | remarks |
| --- | --- | --- | --- | --- | --- | --- |
| Example 19 | polyvinylpyridine | 6 | 7.5 | 0.025 | 99.5 | |
| Example 20 | polycycloolefin (ZEONEX 480) | 4 | 5.0 | 0.028 | 99.5 | |
| Example 21 | polyacrylonitrile-polystyrene copolymer | 12 | 15.0 | 0.027 | 96.7 | |
| Example 22 | polyvinylbutyral | 12 | 15.0 | 0.031 | 89.9 | |
| Example 23 | polystyrene-polybutadiene copolymer | 35 | 43.8 | 0.028 | 95.9 | |
| Example 24 | polybutadiene | 100< | — | 0.035 | 96.7 | fiberform clumps |
| Example 25 | polyacrylonitrile-polybutadiene copolymer | 100< | — | 0.035 | 91.65 | fiberform clumps |
| Example 26 | polystyrene-polyisoprene copolymer | 41 | 51.3 | 0.03 | 99.8 | |
| Example 27 | hyrdogenetion polystyrene-polybutadiene copolymer | 100< | — | 0.041 | 99.3 | fiberform clumps |

What is claimed is:

1. A water-treatment method using a polymer composite, the polymer composite comprising:
   secondary aggregates, the secondary aggregates being formed of clumped particles, the particles being magnetic particles covered with a polymer,
   wherein a mean diameter of the magnetic particles is not less than 0.05 μm and not more than 100 μm,
   the method comprising:
   dispersing the polymer composite in water containing impurities;
   making the polymer composite adsorb the impurities to surfaces of the polymer composite; and
   separating the polymer composite adsorbed the impurities by using magnetic forces,
   wherein C, D, X, E and F satisfy a relationship of $0.001 \leq F/(C \times D \times E) \leq X$, where
   $C$ (m²/g) represents a specific surface area of the magnetic particles;
   $D$ (%) represents a content rate of the magnetic particles to a whole weight of the polymer composite;
   $X$ (μm) represents a mean diameter of the magnetic particles;
   $E$ (g/cm³) presents density of the polymer; and
   $F$ (%) represents a content rate of the polymer to a whole weight of the polymer composite.

2. The method according to claim 1, wherein the water is industrial wastewater.

3. The method according to claim 1, wherein a ratio Z/X of a mean diameter Z of the secondary aggregates to the mean diameter X of the magnetic particles is in a range from 10 to 10000.

4. The method according to claim 1, wherein the secondary aggregates are porous in structure.

5. The method according to claim 1, wherein the polymer is water-insoluble and soluble to one selected from methanol, ethanol, n-propanol, isopropanol, acetone, tetrahydrofuran, n-hexane, cyclohexane and mixtures thereof.

6. The method according to claim 5, wherein the polymer is one selected from polystyrene, hydrogenation polystyrene, polybutadiene, polyisoprene, polyacrylonitrile, polycycloolefin, polyvinyl pyridine, and polyvinyl-butyral and mixtures thereof.

7. The method according to claim 1, wherein the polymer is one selected from polystyrene, hydrogenation polystyrene, polybutadiene, polyisoprene, polyacrylonitrile, polycycloolefin, polyvinyl pyridine, and polyvinyl-butyral and mixtures thereof.

8. The method according to claim 1, wherein used polymer is regenerated to be recycled for further water treatment by washing the used polymer composite with one selected from methanol, ethanol, n-propanol, isopropanol, acetone, tetrahydrofuran, n-hexane, cyclohexane and mixtures thereof.

* * * * *